May 7, 1968 Y. M. HILL 3,382,348

ELECTROSTATICALLY DRIVEN ANALOG DEVICE

Filed May 11, 1964 2 Sheets-Sheet 1

INVENTOR

YATES M. HILL

BY Henry E. Otto Jr.

ATTORNEY

ELECTROSTATICALLY DRIVEN ANALOG DEVICE

Filed May 11, 1964 2 Sheets-Sheet 2

3,382,348

ELECTROSTATICALLY DRIVEN ANALOG DEVICE

Yates M. Hill, Union, N.Y., assignor to International Business Machines Corporation, New York, N.Y., a corporation of New York Filed May 11, 1964, Ser. No. 366,510
19 Claims. (Cl. 235—61.11)

This invention relates to apparatus embodying electrostatically driven analog devices, and relates more particularly to such devices for providing analog or digital outputs corresponding substantially to the amplitude and/or duration of an analog input.

It is known to provide a variable capacitor comprising a flexible element that is anchored at both ends and longer than the distance between the anchorage points to provide a buckled transition point. The location of this transition point is controlled by a mechanically operable capacitance-adjusting member. Said member is positionable at any random location to hold an adjustable length of said flexible element in contact with a dielectric surface, while holding the remainder of the flexible element spaced from said surface. The principal objective of such an arrangement is thus to vary the effective capacitance from a maximum to a minimum depending upon the degree of overlying contact of said element with the dielectric surface; and the position of the transition point is incidental and subordinate to that objective.

It would be desirable, however, to provide an electrostatically driven device responsive to an analog signal of selectable duration and amplitude to so control the physical location of the transition point as to provide a corresponding analog or digital output. Such a device would be useful in a wide variety of applications; e.g., in a display unit, a document reader, an analog or multi-level memory unit, a multi-level control apparatus or counter, an analog-to-digital converter, or an electrical transducer, as will be apparent from some of the illustrative applications hereinafter more fully described.

It is therefore one object of this invention to provide an eletcrostatically driven device wherein the position or physical location of a controlled portion thereof is determined by the duration, amplitude and point of application of an electrical signal.

It is another object of the present invention to provide an analog device with a controlled or transition portion that is electrostatically drivable in a direction corresponding to the point of application of an electrical potential difference and to a discrete position dependent upon the length of time such potential difference is maintained.

A further object is to provide an electrostatically driven analog-to-digital converter.

Still another object is to provide an electrostatically driven control member which is always in neutral mechanical equilibrium, and wherein mechanical friction and mass are minimized.

According to these objects, there is provided an electrostatically driven analog device comprising a pair of parallel spaced flat electrodes having dielectric-coated facing surfaces. A thin electrically conductive strip-like member is disposed between said electrodes and has its ends substantially secured to remote points on opposite ones of said surfaces. The strip-like member is longer than the distance between said points to create a buckled or deformed transition portion. The position of this portion varies by a type of "progressive movement" whereby a section which is bent progressively straightens as an adjacent straight section becomes bent, thus varying the extent of contact of the member with either of said surfaces. The member is connected to a source at one potential, and the surfaces are selectively connected to another potential. This results in such "progressive movement" of the transition portion while one of the surfaces is at a potential different from that of the other surface; such movement being in a direction corresponding to the point of application of such potential difference. As illustrated in the various practical embodiments of the invention herein described, a desired control operation is performed according to the discrete position of the transition portion of the conductive strip-like member.

The foregoing and other objects, features and advantages of the invention will be apparent from the following more particular description of preferred embodiments of the invention, as illustrated in the accompanying drawisgs, wherein.

DESCRIPTION

Figures 1, 4:
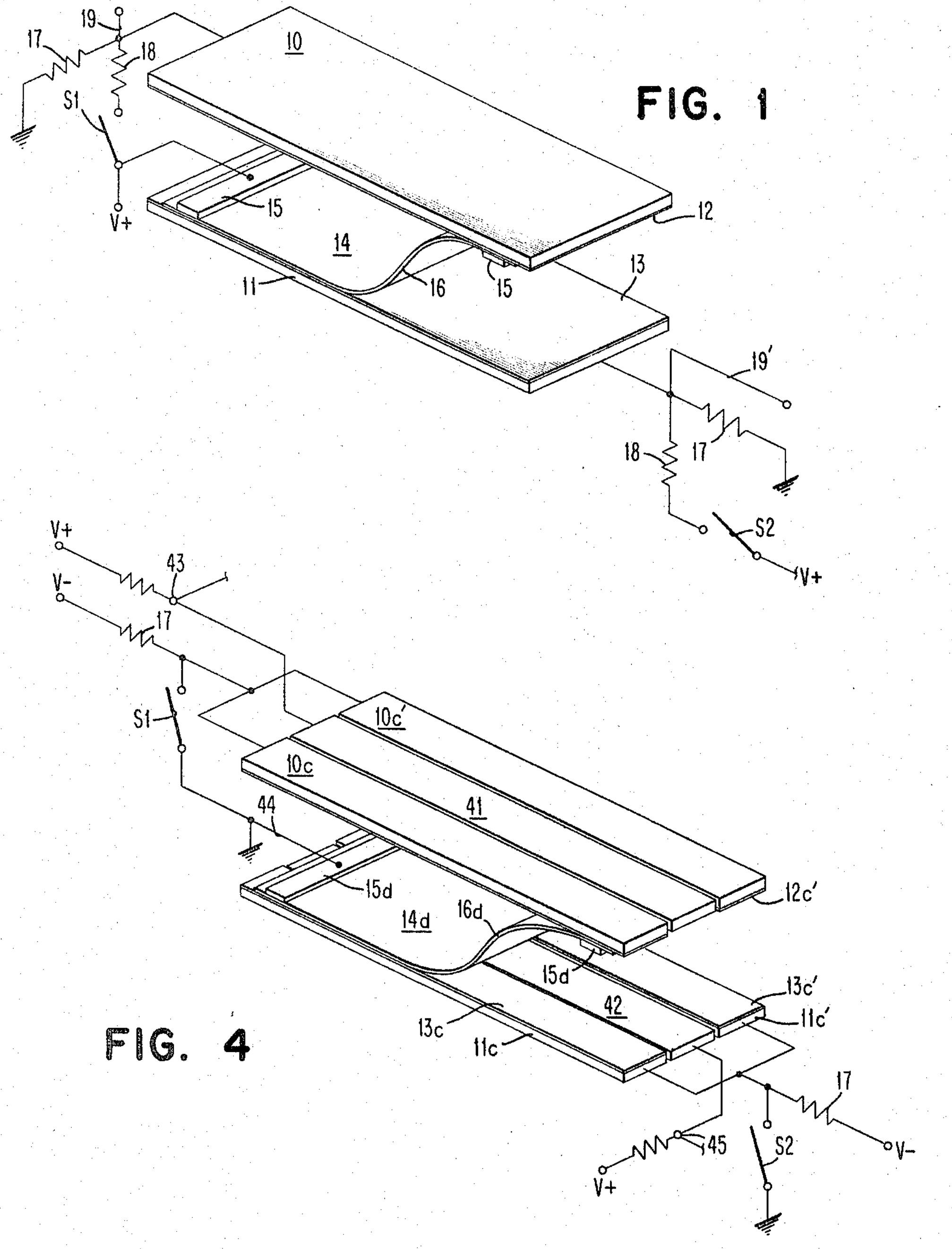
FIG. 1 is a perspective view, partly schematic, of the basic configuration of an electrostatically driven analog device embodying the invention.
FIG. 4 is a perspective view, partly schematic, showing the basic device of FIG. 1 modified to serve as an electrostatically driven analog memory device.

According to the basic configuration shown in FIG. 1, the electrostatically driven device embodying the invention comprises a pair of parallel, spaced electrodes 10, 11. These electrodes provide uniformly spaced, parallel facing surfaces 12, 13, respectively, each provided (e.g., by coating) with a suitable layer of high dielectric material. A movable electrode, in the form of a flexible electrically conductive strip 14, is disposed between the surfaces 12, 13. Adjacent its ends, the strip 14 is suitably clamped, such as by clamping strips 15, to the dielectric-coated surfaces 12, 13 of upper and lower electrodes 10, 11, respectively. Strip 14 is longer than the direct distance between clamping strips 15 so as to assume a generally S shape and permit flush contact of the strip with surfaces 12, 13 except by a buckled transition portion 16 that extends angularly between the surfaces. The strip must be free of twist so that the location of the transition portion can shift readily in a longitudinal direction as more or less of the strip is attracted toward a particular one of the dielectric-coated surfaces 12, 13 by the "progressive" type of movement above described.

This progressive movement of the strip may be controlled in any suitable manner. For example, as illustrated, each electrode 10, 11 is connected to ground by a suitable resistor 17. One of the clamping strips 15 is connected to a source of positive potential V+ to provide a positive charge on the flexible strip 14. Suitable means are provided for selectively connecting the source V+ via a corresponding resistor 18 to the electrodes 10, 11. As illustrated, this means comprises manually operable switches S1, S2, although it will be understood that any other form of switching means (e.g., a transistor) may be used, if desired.

In operation, with switches S1, S2 open and the strip 15 connected to source V+, the strip 14 will be stationary because both fixed electrodes 10, 11 will be at the same potential (i.e., ground). To move the transition portion 16 leftward, switch S2 is closed. This equalizes or neutralizes the potential between the strip 14 and lower electrode, allowing the strip 14 to move away from electrode 11 and toward electrode 10. Movement of the transition portion will continue at a rate corresponding to the difference in potential between strip 14 and electrode 10 and for a length of time corresponding to the duration of the period that switch S2 remains closed with switch S1 open. Conversely, to move the transition portion 16 rightward, switch S1 is closed while switch S2 remains open.

Thus, the transition portion 16 will assume a position which is directly proportional to the duration of the analog signal supplied via switch S1 or switch S2. The direction and rate of movement will be controlled, respectively, by the point of application of the potential difference and the amplitude thereof.

The effective capacitance between the electrodes 10 and 14 will be seen in the circuit including line 19; and the effective capacitance between electrodes 11 and 14 will be seen in the circuit including line 19'. Total capacitance will always be constant, but will be proportioned between the two circuits according to the existing position of the transition portion 16.

Figure 2:
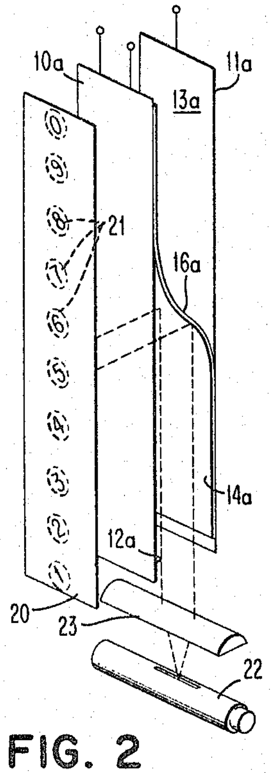
FIG. 2 is a perspective view of an electrostatically driven indicia digital display device illustrating an application of the invention as an analog-to-digital converter.

FIG. 2 shows the invention embodied in an electrostatically driven display device. This device is identical with that shown in FIG. 1 and above described, except in the following respects. One of the fixed electrodes **10*a* and its dielectric coating 12*a* are transparent. Beside and substantially parallel to the outer side of electrode 10*a* is a display element 20 having longitudinally spaced display indicia 21. As illustrated, element 20 is opaque and the indicia are translucent. The conductive strip 14*a* is of reflective material; and suitable means is provided to direct light onto the transition portion 16*a* to cause it to reflect light through coating 12*a* and electrode 10*a* to illuminate that indicia on element 20 corresponding to the existing longitudinal position of said transition portion. As illustrated, this light is provided by a light source 22 and a collimating lens 23** providing a slit-shaped light beam.

If the indicia is not to be illuminated in the same sequence as it is longitudinally positioned on the display element 20, the transition portion **16*a* may be indexed to the desired position by a rapid sequence of pulses or a single pulse of appropriate duration. If indicia is not to be illuminated substantially continuously, an opaque position may be provided in element 20; or suitable switching means (not shown) may be provided to turn off the light beam except when the transition portion 16*a*** is properly positioned to illuminate a desired one of the indicia.

Figure 2A:
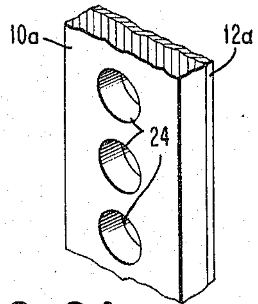
FIG. 2A is a fragmentary view, to enlarged scale, of a modified portion of the device shown in FIG. 2.

If desired, means may be provided for varying the amount of attractive force between the strip **14*a* and respective surfaces 12*a* and 13*a*, according to a predetermined pattern. For example, as illustrated in FIG. 2A, this means may take the form of a plurality of perforations 24 provided in the electrode 10*a* (and/or if desired in electrode 11*a*) to cause the transition portion to tend to assume one of a corresponding limited number of predetermined discrete longitudinal positions corresponding to the longitudinal spacing between adjacent indicia 21. However, if preferred, the same effect of varying the amount of attractive force between the member and dielectric surface may be achieved by varying the width of the strip 14*a* in a direction transverse to the direction of movement of the transition portion; but, in such case, the width of the fixed electrodes should be limited to the minimum width of the flexible member so the supplied bending force will be maintained constant but the bending force required will vary, being smallest at the places where the member is narrowest. Thus, variation of the effective width of either or both of the fixed electrodes 10*a*, 11*a* varies the degree of attractive or bending force exerted on the strip 14*a*; whereas varying the width of the conductive strip 14*a*** varies the amount of bending force required, while maintaining the effective areas of the fixed electrodes constant.

Figure 3:
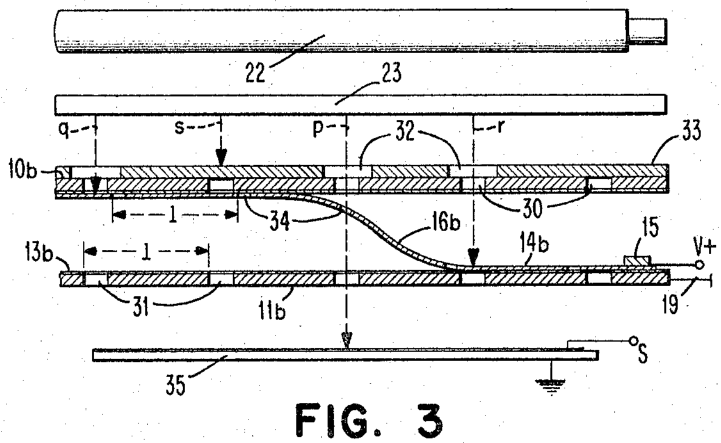
FIG. 3 is a vertical section view of an apparatus for reading coded perforate information from a document, for illustrating another application of the invention.

In the document reading apparatus embodying the invention and illustrated in FIG. 3, fixed electrodes **10*b* and 11*b* have a plurality of identical vertically aligned apertures 30, 31, respectively. The number of these apertures 30 or 31 corresponds to the maximum number of apertures, such as perforations 32, providable in respective rows (or columns) of a record element 33, such as a punched card or perforated tape. The conductive strip 14*b* has a like number of apertures 34**.

The distance or "pitch" between the leading edges of respective apertures 30, 31, 32, 34 is a common dimension 1 in each case. But the lengths and widths of these apertures preferably varies, as shown in FIG. 3, with apertures 30, 31 being wider than the length of apertures 34 in the flexible member **14*b* but narrower than the width of the perforations 32 in the record element 33. The light beam from source 22 and collimator lens 23 can pass through perforations 32 to a light-sensitive element or solar cell 35 only when transition portion 16*b* moves to a position in which it aligns an aperture 34 with the apertures 30, 31** in the fixed electrodes, as denoted by the broken line *p*. When strip **14*b* lies against surface 12*b* or 13*b*, the apertures 34 will be out of registry with apertures 30, 31** as shown by the broken lines *q*, *r*, respectively, thus preventing the passage of light even if one of the perforations 32 is then aligned with apertures 30, 31. When no perforation 32 is present, passage of light will be blocked by the element 33, as denoted by the broken line *s*.

Figure 3A:
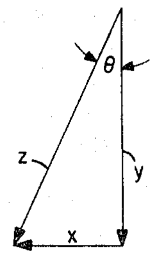
FIG. 3A is a diagram illustrating the relationships between the direction of document feeding and direction of movement of the electrostatically driven device to provide sequential sensing of data while the document is moving.

As transition portion **16*b* moves past a row of perforations 32, light pulses striking cell 35 will produce a sequence of output voltage pulses corresponding to the perforate coded indicia in element 33. As illustrated, the record element 33 is moving orthogonally to the direction of movement of the transition portion 16*b*. If the perforations 32 in element 33 are to be read sequentially while the element 33 is in motion, the transition portion 16*b*** must move along the path indicated as *z* in FIG. 3A, wherein *x* corresponds to the velocity vector of the record element, and *y* corresponds to the effective or relative velocity vector of the transition portion orthogonally of the record element.

The electrostatically driven analog memory device shown in FIG. 4 differs from the basic device shown in FIG. 1 in the following respects. The upper and lower electrodes are longitudinally split into two pairs **10*c*, 10*c'* and 11*c*, 11*c'*. Resistance strips 41 and 42 are inserted between the electrode pairs 10*c*, 10*c'* and 11*c*, 11*c'*, respectively. The clamping members 15*d*** extend across the width of the fixed electrode pairs and intervening resistance strips.

When, for example, switch S2 is closed, the transition portion **16*d* of flexible strip 14*d* will move leftward, thus decreasing the resistance in the circuit including a potential source V+, resistor, output terminal 43, strip 41, and the portion of strip 14*d* then connected via line 44 to ground. The output potential level at 43 will decrease as the transition portion 16*d* moves leftward and decreases the effective resistance in said circuit; and when movement of the transition portion ceases, the output potential level at 43 will remain substantially constant at a value corresponding to the effective resistance then remaining in the circuit just described. Meanwhile, the output voltage level will also be provided at 45 via a circuit comparable to that just described; and such output voltage level will vary such that the sums of the voltages at 43 and 45** will always remain substantially constant.

Figure 5:
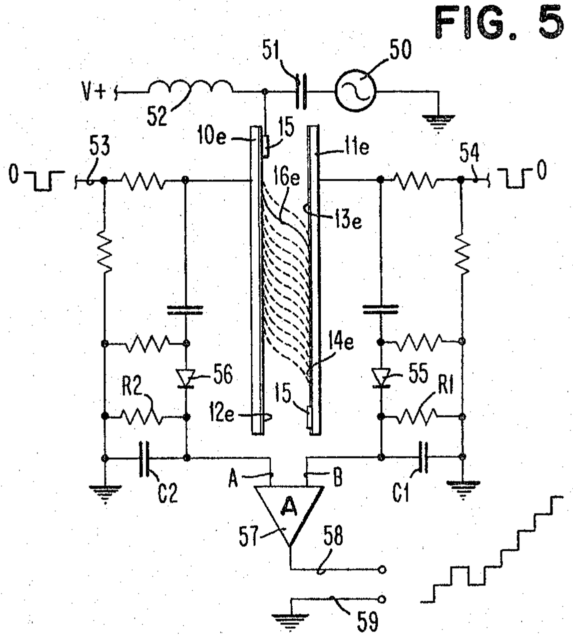
FIG. 5 is a circuit diagram of a multi-level control element or counter illustrating still another application of the invention.

The multi-level control element or counter shown in FIG. 5 comprises a high frequency AC source 50 which is connected via a capacitor 51 to the clamping strip 15 that clamps a flexible movable conductive strip 14e to the dielectric-coated surface 12e of fixed electrode 10e. A clamping strip 15 clamps the other end of conductive strip 14e to dielectric-coated surface 13e of fixed electrode 11e. Source 50 impresses an alternating current wave on a direct current signal provided from a DC source V+ via a radio frequency choke or decoupling connector 52.

When the signal levels in both inputs 53, 54 are up (e.g., at 0, as illustrated) transition portion 16e will be stationary. With portion 16e near the upper clamp 15, as shown, a higher degree of coupling will be provided through circuit B than through circuit A. This higher degree of coupling to the diode 55 and filter R1C1 than to the left diode 56 and filter R2C2 produces a DC voltage at B greater than at A. A DC coupled differential amplifier 57 provides a variable DC output voltage level.

A negative-going pulse to input 53 while the level to input 54 is up will cause transition portion 16e to move down; and, conversely, portion 16e will move up if a negative-going pulse is applied only to input 54.

Assuming the input pulses to 53, 54 are of uniform width and amplitude, the signal level across reference points 58, 59 will drop or rise one increment responsively to each negative-going pulse supplied selectively to input 53 or 54.

Increasing the duration of the input pulses to 53 or 54 will correspondingly increase the degree of variation (vertical change) in the output signal level per pulse; and conversely. The length of time between successive changes in voltage level will vary according to the interval of time between successive input pulses.

Thus, the device will act as a counter providing a digital voltage level corresponding to the algebraic sum of the negative-going "add" pulses to input 54 and negative-going "subtract" pulses to input 53.

It has been found by actual test that the electrostatically driven devices embodying the invention provide stable equilibrium for all longitudinal positions of the transition portion. Mechanical friction and mass are minimized. Strong electrostatic fields and hence forces are produced with relatively low voltages, and relatively slow particle velocities are converted into faster transition velocities. Also, of special importance for scanning applications, it has been found that by suitable control of potential levels, driving impedances, and flexibility of the movable strip, the transition portion can be moved in air at a substantially constant velocity and with a minimal acceleration time.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An electrostatically driven device comprising:
a pair of electrodes providing substantially uniformly spaced surfaces,
means providing layers of dielectric overlying said surfaces,
a thin, movable, electrically conductive strip-like member, the end portions of which are held respectively against remote points of one and the other of said layers, said member being longer than the distance between said points to permit selective contact of said member with said layers except for a transition portion extending angularly between said layers, and
means for creating a potential difference between said member and at least one of said electrodes to cause a progressive movement of the transition portion relative to said surfaces in a direction corresponding to the point of application of such potential difference.

2. The combination according to claim 1, wherein the rate of such progressive movement of the transition portion varies according to the magnitude of said potential difference.

3. The combination according to claim 1, wherein the extent of movement of said transition portion varies according to the length of time said potential difference is maintained.

4. The combination according to claim 1, wherein said surfaces are flat and substantially parallel.

5. An electrostatically driven device comprising:
a pair of electrodes providing substantially uniformly spaced surfaces,
means providing layers of dielectric overlying said surfaces,
a thin, movable, electrically conductive strip-like member, the end portions of which are held respectively against remote points of one and the other of said layers, said member being longer than the distance between said points to permit substantially flush contact of said member with said layers except for a transition portion extending angularly between said layers,
means for connecting said member to a source at one potential, and
means for controlling connection of said electrodes to a source at another potential to cause a progressive movement of the transition portion so long as one of said electrodes is at a potential difference from that of the other electrode.

6. An electrostatically driven device comprising:
a pair of electrodes providing substantially parallel uniformly spaced flat surfaces,
means providing layers of dielectric overlying said surfaces,
a thin, movable, electrically conductive strip-like member, the end portions of which are held respectively against remote points of said one and the other of said layers, said member being longer than the distance between said points to permit selective contact of said member with said layers except for a transition portion extending angularly between said layers,
means for connecting said member to a source at one potential,
means for connecting said electrodes to another source at another potential, and
means for selectively disconnecting said electrodes from said other source to create an unbalance in potential for causing a progressive movement of the transition portion relative to said surfaces during the period of time such unbalance persists.

7. The combination according to claim 1, wherein said member is a reflecting strip, and
at least one of said electrodes and its overlying dielectric layer permit passage of at least some light therethrough, and including
an element disposed adjacent said one electrode and having display indicia thereon, and
means for directing light onto said transition portion to cause it to reflect light through said one electrode onto said element to illuminate that indicia corresponding to the existing position of said transition portion.

8. An electrostatically driven display device comprising:
a pair of parallel spaced electrodes having adjacent surfaces coated with dielectric,
at least one of said electrodes and its dielectric coating being substantially transparent,
an electrically conductive reflecting strip held adjacent its one end against one of said surfaces and held adjacent its other end against the other of said surfaces at remote points generally near the non-adjacent ends of said electrodes, said strip being longer than the shortest distance between said points to provide a movable buckled transition portion, means for creating a potential difference between the strip and at least one of said electrodes to cause progressive movement of the transition portion relative to said surfaces,
an element disposed adjacent the transparent electrode and coating, and having display indicia thereon, and
means for directing light onto said portion to cause the latter to reflect light onto the indicia corresponding to the existing position of said transition portion.

9. The combination according to claim 1, wherein
said electrodes have essentially aligned apertures of substantially similar size and spacing,
said member having apertures of substantially corresponding spacing which are aligned with the electrode apertures only when such member apertures lie in the transition portion between the electrodes,
a record element disposed adjacent either of the electrodes and having openings representing coded information,
means for effecting relative movement between said element and electrodes, and
sensing means for providing predetermined signals when the openings are aligned with the apertures in said electrodes and transition portion.

10. The combination according to claim 9, wherein the openings are sensed sequentially as said transition portion moves transversely of said openings.

11. The combination according to claim 9, wherein said record element moves in a direction oblique to that of said member as necessary to provide sequential sensing of said openings while said record element is in motion.

12. Apparatus for sequentially scanning perforate indicia in a movable record element, comprising:
a pair of substantially flat spaced, parallel dielectric-coated stationary electrodes having aligned apertures of a spacing corresponding generally to that between adjacent perforate indicia of the record element,
an electrically conductive strip disposed between said electrodes and having its ends substantially secured to remote points on opposite ones of said electrodes and longer than the distance between said points to create a transition portion, the position of which varies with the extent of contact of said strip with either electrode,
said strip having respective apertures which are aligned with corresponding electrode apertures only when the strip apertures lie in the transition portion extending between said electrodes, and
sensing means for providing signals when the indicia-denoting perforations and the apertures in said electrodes and strip become mutually aligned to cause the indicia to be read sequentially according to the relative rates of movement of the record element and transition portion.

13. Apparatus for sequentially scanning from a record element indicia in the form of perforations having a predetermined pitch distance spacing, comprising:
a pair of electrodes providing substantially uniformly spaced dielectric-coated surfaces,
an electrically conductive strip, the end portions of which are held respectively against remote points of one and the other of said surfaces, said strip being longer than the distance between said points to create a transition portion, the position of which varies with the extent of the contact of said strip with either electrode,
said electrodes and strip having apertures with said pitch distance spacing, but the length of the apertures in said electrodes being less than that of the perforate indicia and greater than that of the apertures in the strip, and disposed such that the apertures in the strip can align with the electrode apertures only when the strip apertures lie in the transition portion, and
sensing means for providing signals when the indicia-denoting perforations and the apertures in said electrodes and strip become mutually aligned to cause the indicia to be read sequentially as said transition portion moves relative to the record element.

14. A combination according to claim 1, wherein
a resistance strip is located beside at least one of the electrodes so as to be contacted by said member when attracted to the surface of the associated electrode, and
an output circuit connected to each resistance strip to provide an analog output voltage signal corresponding to the position of said transition portion.

15. An electrostatically driven analog device comprising,
electrode means providing spaced substantially parallel surfaces coated with dielectric material,
at least one resistance strip providing an electrically conductive surface parallel to and lying beside a corresponding one of the dielectric coated surfaces,
a flexible electrically conductive strip wide enough for intimate contact with the coated and conductive surfaces,
means for clamping one end portion of the strip adjacent one end of one of said coated surface and conductive surface,
means for clamping the other end portion of the strip adjacent the remote end of the other coated surface and conductive surface,
a separate output circuit connected to each resistance strip, and
means for varying the potential difference between said flexible strip and at least one of said electrode means to cause a controlled progressive movement of the transition portion to a desired longitudinal position and produce an analog output voltage signal in each output circuit corresponding to such longitudinal position.

16. The combination according to claim 15, wherein the output voltage signals of the output circuits for two oppositely arranged resistance strips vary such that their sum is substantially constant.

17. The combination according to claim 1, including means for varying the magnitude of the attractive force between said member and said surface according to a predetermined pattern to cause the transition portion to tend to assume one of a corresponding limited number of predetermined discrete longitudinal positions nearest that assumed when said potential difference ceases.

18. The combination according to claim 17, wherein variation in the magnitude of attractive force is accomplished by varying the effective width of at least one of said electrodes.

19. The combination according to claim 1, including
differential amplifier means for providing an output voltage signal level corresponding to the position of said transition portion,
circuit means responsive to one input pulse for providing a rectified signal to one input of the differential amplifier means to cause said level to rise, and
other circuit means responsive to another input pulse for providing a rectified signal to the other input of said differential amplifier means to cause said level to drop,
the degree of rise and drop in signal level corresponding to the duration of said one and other input pulse, respectively.

References Cited

UNITED STATES PATENTS

| | | | |
|---|---|---|---|
| 2,789,259 | 4/1957 | Eisler et al. | 317—249 |
| 2,931,954 | 4/1960 | Diesel | 317—144 |

DARYL W. COOK, *Primary Examiner.*